US006772498B2

(12) United States Patent
Kunimoto et al.

(10) Patent No.: US 6,772,498 B2
(45) Date of Patent: Aug. 10, 2004

(54) METHOD OF MANUFACTURING DEWARS

(75) Inventors: Wallace Yoshito Kunimoto, Goleta, CA (US); Angela May Ho, Buellton, CA (US); Elna Ruri Saito, Santa Barbara, CA (US); Arturo Soto, Oxnard, CA (US); Gregory Ronald Harrah, Santa Barbara, CA (US)

(73) Assignee: Superconductor Technologies, Inc., Santa Barbara, CA (US)

(*) Notice: Subject to any disclaimer, the term of this patent is extended or adjusted under 35 U.S.C. 154(b) by 0 days.

(21) Appl. No.: 10/421,559

(22) Filed: Apr. 22, 2003

(65) Prior Publication Data

US 2003/0196311 A1 Oct. 23, 2003

Related U.S. Application Data

(62) Division of application No. 09/765,178, filed on Jan. 17, 2001, now Pat. No. 6,568,194.

(51) Int. Cl.$^{7}$ .................................................. B23P 25/00

(52) U.S. Cl. ............................. 29/458; 29/446; 29/515; 29/600; 62/48.1

(58) Field of Search ........................ 29/446, 458, 469.5, 29/505, 515, 897, 897.3, 600; 62/48.1, 51.1

(56) References Cited

U.S. PATENT DOCUMENTS 3,258,602 A 6/1966 Promish
3,628,347 A 12/1971 Puckett et al.
4,411,138 A 10/1983 Leithauser et al.
4,794,761 A 1/1989 Fredrixon
5,012,102 A * 4/1991 Gowlett ....................... 250/352
5,375,423 A 12/1994 Delatte
5,404,016 A 4/1995 Boyd et al.
5,433,639 A * 7/1995 Zahuta et al. ................. 445/40
5,488,831 A 2/1996 Griswold
5,542,256 A 8/1996 Batey et al.
5,611,207 A 3/1997 Hess
5,983,646 A 11/1999 Grothe et al.
6,112,526 A 9/2000 Chase
6,568,194 B1 * 5/2003 Kunimoto et al. ........... 62/48.1

FOREIGN PATENT DOCUMENTS

JP 57045422 A * 3/1982 ............ G01K/5/32
WO WO 02/099331 A2 * 12/2002 ............ F17C/3/02

* cited by examiner

*Primary Examiner*—Essama Omgba
(74) *Attorney, Agent, or Firm*—O'Melveny & Myers LLP

(57) ABSTRACT

An improved dewar design that accelerates the manufacturing process of a dewar. In a preferred embodiment, the dewar includes an evacuation port that may be larger in size by a factor of ten over the size of evacuation ports of conventional dewars. The oversized evacuation port, however, does not result in an increase in the overall size or profile of the dewar. The dewar is evacuated and hermetically sealed using an re-usable evacuation tool.

9 Claims, 2 Drawing Sheets

METHOD OF MANUFACTURING DEWARS

CROSS-REFERENCE TO RELATED APPLICATIONS

This application is a divisional of U.S. application Ser. No. 09/765,178, filed Jan. 17, 2001, now U.S. Pat. No. 6,568,194 allowed, which is fully and expressly incorporated by reference herein.

FIELD OF THE INVENTION

The present invention relates generally to dewars for high temperature superconducting (HTS) filter systems for use in, for example, cellular PCS systems and, more particularly, an evacuation port and closure for such dewars.

BACKGROUND OF THE INVENTION

Recently, substantial attention has been devoted to the development of high temperature superconducting radio frequency (RF) filters for use in, for example, cellular telecommunications systems. Those skilled in the art will appreciate that, when multiple HTS filters are deployed, for example, within a dewar cooled by a cryocooler, on a telecommunications tower, substantial durability and reliability issues may arise. For example, when a system is to be mounted at the top of a tower, the system must be able to withstand significant changes in climate and weather, and the system must be reliable and require minimal maintenance.

In this regard, the final step in manufacturing a durable, long life dewar, i.e., a dewar having a life span greater than 10 years, is to vacuum bake the dewar at as high a temperature as possible to degas the dewar and its components, which include temperature sensors, HTSC RF filters, getters, etc., without damaging these components and impacting their functional capability. While the dewar is baked, it is attached to a vacuum pump via a tip-off tube and evacuated. The vacuum pump will reduce the pressure within the dewar to less than $10^{-4}$ torr and typically to less than $10^{-8}$ torr at the time the tip-off tube is pinched off to seal the dewar. At these low pressures, the gas molecules that are outgassed from the dewar and its components will move in straight lines until the gas molecules strike a wall of the dewar or component, or another gas molecule. The gas molecules will be removed or evacuated from the dewar as they find the inside of the tip-off tube. Because the tip-off tube typically has a relative small inside diameter to minimize the size or footprint of the dewar, the degassing process tends to be quite time consuming. Typically, the dewar is vacuum baked for several days until the outgassing decreases to an acceptable level.

With the increased demand from the cellular telecommunications industry for these dewar deployed HTS filters, dewar manufacturers must find ways to increase the supply of these dewars at lower costs. Because the vacuum baking of the dewars is the most time intensive step of the manufacturing process, one option to increase the output of dewars would be to invest in more automated vacuum bakeout equipment. However, automated vacuum bakeout equipment is very expensive and, thus, this option is not necessarily the most desirable. Another option would be to reduce the time required to vacuum bake the dewars by increasing the rate at which the gas molecules are evacuated from the dewar. Because the gas molecules are only evacuated as they find the inside of the tip-off tube, the rate at which the gas molecules were evacuated would increase if the size of the tip-off tube were increased. However, because the length of the tip-off tube, or distance from the dewar at which the tip-off tube is pinched off, is directly proportional to the diameter of the tip-off tube, this option would result in an undesirable increase in the overall size or profile of these dewars.

Thus, it would be desirable to increase the manufacturing output of these dewar deployed HTS filters without drastically increasing a manufacturers capital equipment investment or increasing the size of the dewar.

SUMMARY OF THE INVENTION

The present invention is directed to an improved dewar for high temperature superconducting RF filter systems and process for manufacturing the same. In a particularly innovative aspect, a dewar in accordance with the present invention includes an oversized evacuation port, which may be greater in size by about a factor of ten than the size of an evacuation port of a conventional dewar, without increasing its overall size or profile. The incorporation of an oversized evacuation port is particularly advantageous from a manufacturing standpoint in that the time it takes to vacuum bake the dewar is substantially reduced. Specifically, there is a greater probability that the gas molecules being outgassed from the dewar and its components will find the inside diameter of a larger evacuation port and, thus, will be more quickly evacuated from the dewar. Moreover, a dewar in accordance with the present invention comprises a low profile cap that seals the evacuation port.

Prior to vacuum baking the dewar, a re-useable evacuation tool is coupled to the evacuation port of the dewar. The tool includes a housing, a capping tool positioned in the housing, and a side arm extending from the housing, which is attachable to a vacuum pump. The tool is advantageously bakeable up to a temperature of 100° C. to 125° C. Once the vacuum bakeout process is completed, the capping tool is actuated to cold weld the low profile cap to the tip-off flange on the end of the evacuation port and hermetically seals the dewar.

Other objects and features of the present invention will become apparent from consideration of the following description taken in conjunction with the accompanying drawings.

DETAILED DESCRIPTION OF PREFERRED EMBODIMENTS

Figure 1:
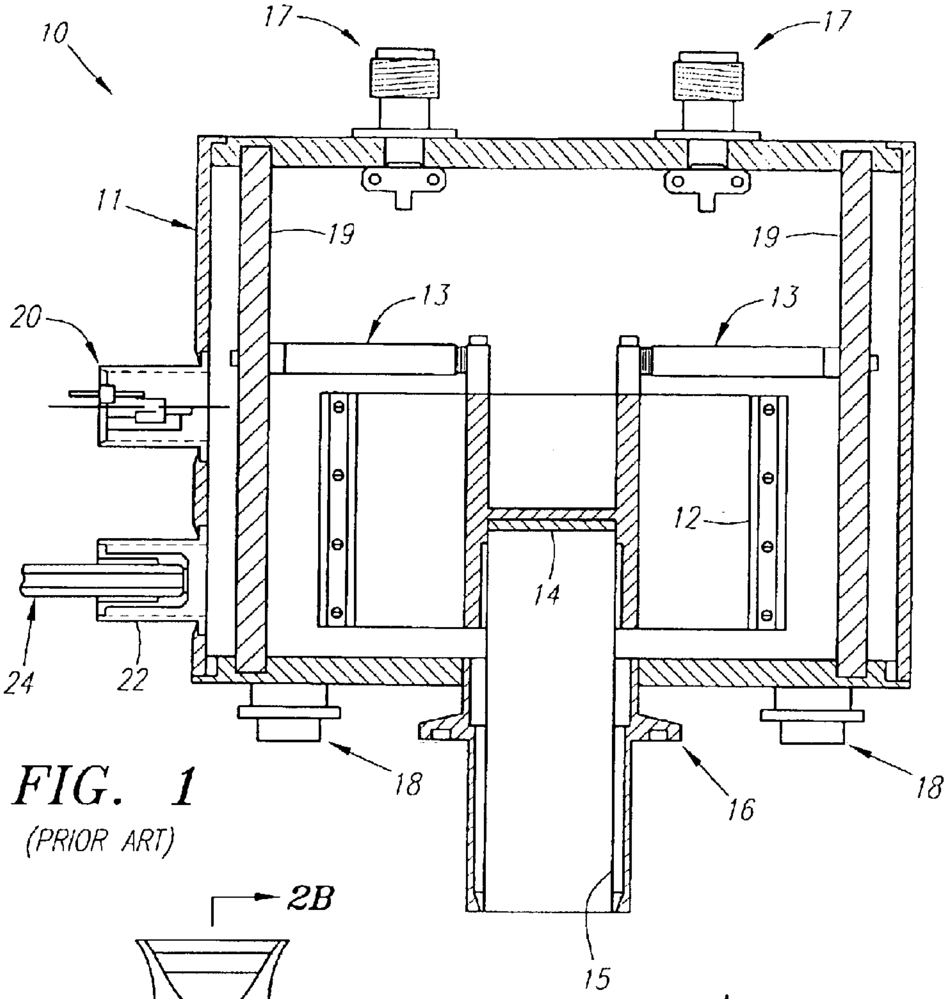
FIG. 1 (PRIOR ART)
FIG. 1 is a cross-sectional view of a typical dewar of the prior art that has high temperature superconductor RF filter assemblies thermally attached to a heatsink.

Turning now to the drawings, FIG. 1 provides a cross-sectional view of a typical dewar 10 of the prior art. The dewar 10 includes a hermetically sealed cylindrical drum-like housing 11 preferably formed from stainless steel. A heatsink 12, to which high temperature superconductor (HTS) RF filter assemblies (not shown) are thermally attached, is fixed in place within the housing 11 via a series of struts 13 which attach to a series of supports 19 embedded in the housing 11. The heatsink 12 is cooled by a closed cycle cryogenic cooler (not shown) that thermally interfaces to a dewar coldfinger 14 through a supply tube 15. The supply tube 15, which extends through the base of the housing 11, includes a flange 16 that mates to a cryocooler flange (not shown). The dewar 10 also typically includes a series of DC power connectors 18, a series of RF connectors 17, and a getter 20. Lastly, a tip-off tube 24, which is typically formed from annealed copper tubing, is brazed to mate with an evacuation port 22.

Figure 2A:
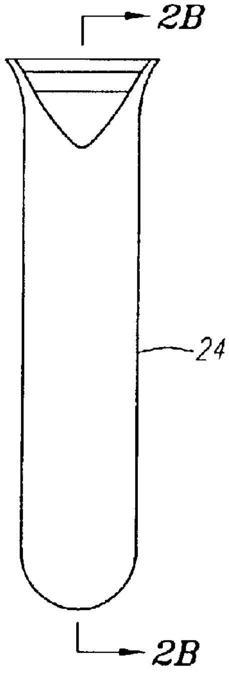
FIG. 2A (PRIOR ART)
FIG. 2A is a plan view of a tip-off tube of the prior art that has been pinched off.
Figure 2B:
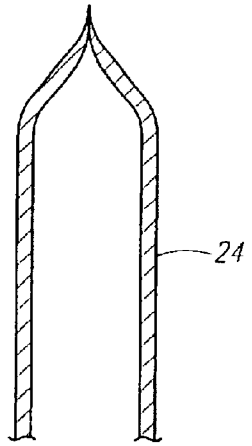
FIG. 2B (PRIOR ART)
FIG. 2B is a partial cross-sectional view of the tip-off tube shown in FIG. 2A taken along line 2B—2B.

A final step in the process of manufacturing a durable dewar 10 with a life expectancy of 10 years or more, is to vacuum bake the dewar 10 at as high a temperature as possible to degas the dewar 10 and its components, which include temperature sensors, HTSC RF filters, getters, etc., without damaging these components and impacting their functional capability. While the dewar 10 is baked, the tip-off tube 24 is attached to a vacuum pump (not shown) to evacuate the dewar 10. The vacuum pump will reduce the pressure within the dewar 10 to less than $10^{-4}$ torr and typically to less than $10^{-8}$ torr at the time the tip-off tube 24 is pinched off, i.e. squeezed between two rollers that cause the copper tubing of the tip-off tube 24 to cold weld to itself, to create a hermetic seal (see FIGS. 2A and 2B). At these low pressures, the gas molecules that are outgassing from the dewar 10 and its components will move in straight lines until the gas molecules strike a wall of the dewar 10 or component, or another gas molecule. The gas molecules will be removed or evacuated from the dewar 10 as they find the inside of the tip-off tube 24. The larger the inside diameter of the tip-off tube 24, the easier it is for the molecules to be removed by the vacuum pump. However, because the distance from the dewar 10 at which the tip-off tube 24 can be pinched-off is directly proportional to the diameter of the tip-off tube 24, and because it is desirable to minimize the dewar's 10 profile, the tip-off tube 24 typically has a relative small inside diameter. As a result, the degassing process tends to be quite time consuming as the gas molecules slowly find the inside of the small diameter tip-off tube 24. Typically, the dewar 10 is vacuum baked for several days until the outgassing decreases to an acceptable level.

To accelerate the vacuum baking step of the manufacturing process, the evacuation port of a dewar of the present invention has a cross-sectional area that is significantly larger than the cross-sectional area of the tip-off tube of a conventional dewar. Moreover, a dewar evacuation port according to the present invention can be increased in size by a factor of ten over the conventional dewar evacuation port without increasing the overall size or profile of the dewar. Increasing the cross-sectional area of the evacuation port significantly increases the probability that a gas molecule will be removed by the vacuum pump and, thus, shortens the time the dewar must be vacuum baked.

Figure 3:
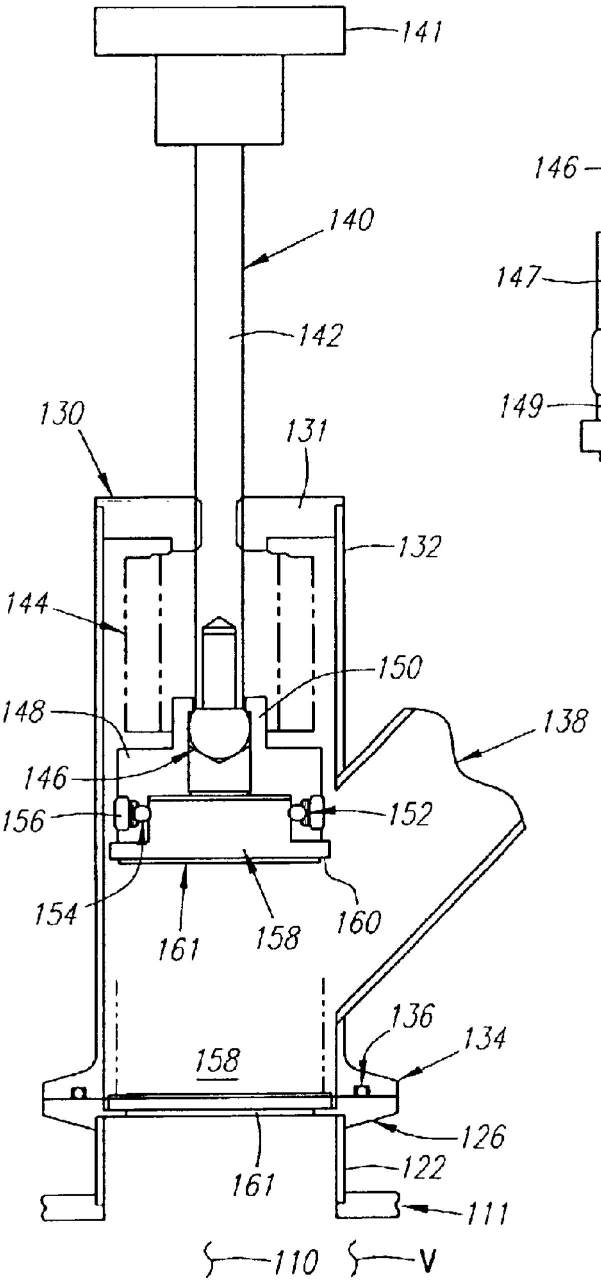
FIG. 3 is a partial plan view of a cap port and evacuation tool of the present invention, wherein the evacuation tool is attached to the tip-off flange of a dewar.

Turning to FIG. 3, the dewar 110 of the present invention includes a large diameter evacuation port 122 that extends from the housing 111 of the dewar 110. A tip-off flange 126 is formed on the end of the evacuation port 122. A reusable evacuation tool 130, which is used to evacuate the dewar 110 and seal its large diameter evacuation port 122, is coupled to the dewar 110. The evacuation tool 130 is advantageously bakeable at a temperature of up to 125° C. and comprises metallic surfaces that are low outgassing.

The evacuation tool 130 includes an elongated cylindrical housing 132 and a cylindrical side arm or vacuum port 138 that opens into the housing 132 and extends from the housing 132 to a vacuum pump (not shown). A flange 134 is formed on the end of the housing 132 adjacent the dewar 110 and is coupled to the tip-off flange 126 of the dewar 110 with a clamp (not shown). A vacuum seal is maintained between the tip-off flange 126 and the flange 134 of the evacuation tool by a low outgassing o-ring 136 such as a VITON® or KAL REZ™ (Dupont trademarks) o-ring. The other end of the housing 132 is sealed with a cover 131.

The evacuation tool 130 includes a capping tool 140 used to cap the evacuation port 122 on the dewar 110. The capping tool 140 includes a clamping knob 141 connected to an elongated threaded shaft 142 that slidably extends through the threaded section of cover 131 of the evacuation tool 130. The shaft 142, which includes a tooling ball 146 attached to its end, is mechanically coupled to a tooling head 148 and a diaphragm bellows 144. The tooling ball 146 is rotatably captured in a tooling seat 150 of the tooling head 148. Rotation of the clamping knob 141 and, hence, the shaft 142, of the capping tool 140 causes the bellows 144 to linearly expand or contract without rotating. Expansion of the bellows 144 causes the shaft 142 to extend into the housing 132 and forces the tooling head 148 toward the flange 134 end of the evacuation tool 130. Rotation of the clamping knob 141 in the opposite direction causes the bellows to linearly contract, which causes the shaft 142 to withdraw from the housing 132 and the tooling head 148 to withdraw toward the cover 131 end of the evacuation tool 130.

Figure 4:
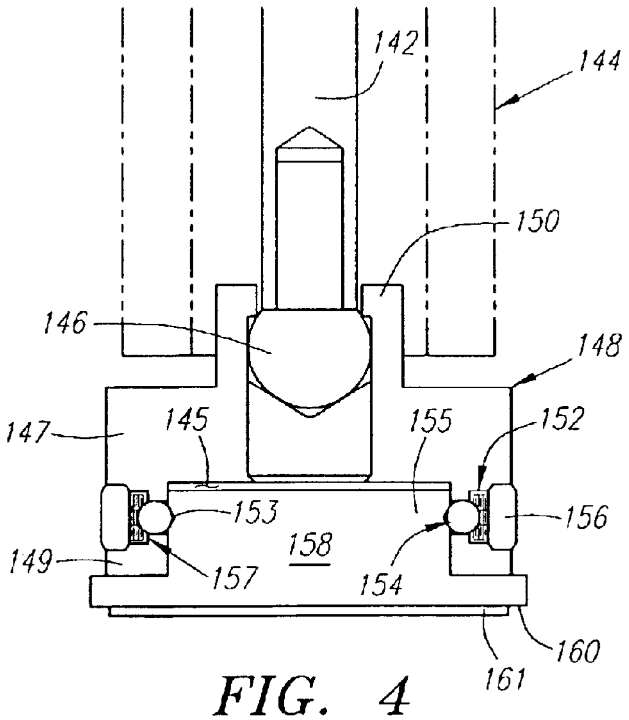
FIG. 4 is a partial plan view of the cap port captured by the evacuation tool.

A preferably low profile port cap 158 (see, in detail, FIG. 4) is releasably captured by the tooling head 148. The tooling head 148 is substantially cup shaped having a base 147 and sidewall 149 defining a holding area 145. Hardened CRES balls 154 are mounted in retaining cavities 157 formed in the side wall 149 of the tooling head 148, such that only a portion of the CRES balls 154 extend into the holding area 145 of the tooling head 148 to engage a recess 153 formed in the perimeter of a head portion 155 of the port cap 158. The CRES balls 154 are lightly loaded with disc or coil springs 152 to releasably retain the port cap 158. Spring covers 156 hold the disc springs 152 in the retaining cavities 157.

The surface 160 of the port cap 158 that makes contact with the tip-off flange 126 is preferably electroplated with a layer 161 of indium metal. The layer 161 of indium metal is preferably 0.002 to 0.010 inches thick. Alternatively, the indium metal may be in the form of an o-ring or washer attached to the surface 160 of the port cap 158. Because indium is a very soft, compliant metal and because the mating surfaces of the indium layer 161 and the tip-off flange 126 are very clean after being vacuum baked over several days at a temperature of about 100° C. to 125° C., the indium layer 161 and tip-off flange 126 are easily cold welded when pressure is applied.

In operation, the evacuation tool 130 is connected to the dewar 110 by clamping the flange 134 of the evacuation tool 130 to the tip-off flange 126 of the dewar 110. The evacuation tool 130 is placed in an open position, as shown in FIG. 3, with the tooling head 148 and port cap 158 withdrawn toward the cover 131 end of the housing 132. The vacuum port 138 is attached to a vacuum pump (not shown). While the dewar 110 and tool 130 are baked at a temperature of about 100° C. to 125° C., the vacuum pump is operated to evacuate the gas molecules through the opening of evacuation port 122 and tip-off flange 126 and create a vacuum "V" within the dewar 110. The opening in the evacuation port 122 and tip-off flange 126 is preferably about 1.57 inches in diameter. Such a large opening will tend to reduce the vacuum baking time necessary to sufficiently evacuate the gas molecules being outgassed from the dewar 110 and its components.

When the vacuum baking process is completed, the evacuation tool 130 is used to hermetically seal the opening of the tip-off flange 126 of the dewar 110. The clamping knob 141 of the capping tool 140 is rotated to expand the bellows 144. The bellows 144 is expanded until the evacuation tool 130 is effectively closed and the evacuation port 122 of the dewar 110 is sealed by cold welding the indium layer 161 of the port cap 158 to the tip-off flange 126.

With the evacuation tool 130 closed and the evacuation port 122 sealed, atmospheric pressure enters the housing 132 of the tool 130 through vacuum port 138 by opening a valve at the vacuum pump to atmosphere. As a result, atmospheric pressure is asserted on the port cap 158 to hold it in place. With the cap 158 of the preferred embodiment at atmospheric pressure, i.e., 14.7 pounds per square inch, more than 28.4 pounds of force is applied to the cap 158 that has a diameter greater than the 1.57 inch diameter opening of the tip-off flange 126. As a result, when the clamping knob 141 is rotated to open the evacuation tool 130 by contracting the bellows 144, the atmospheric pressure exerted on the port cap 158 overcomes the pressure exerted by the CRES balls 154 and disk springs 152, and causes the port cap 158 to disconnect from the tooling head 148 and remain connected to the dewar 110. With the port cap 158 hermetically sealed to the dewar 110, the clamp physically holding the evacuation tool 130 to the tip-off flange 126 is removed to remove the evacuation tool 130.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A process for manufacturing dewars, comprising the steps of:

providing a dewar having an evacuation port, coupling an evacuation tool to the evacuation port of the dewar, the evacuation tool comprising a housing, a capping tool positioned in the housing, a low profile cap releaseably retained by the capping tool, and a side arm extending from the housing and being attachable to a vacuum pump, vacuum baking the dewar and evacuation tool, and actuating the capping tool to sealingly connect the cap to the evacuation port.

2. The process of claim 1 wherein the step of vacuum baking is conducted at a temperature of 100° C. to 125° C.

3. The process of claim 1 further comprising the step of electroplating with a soft metal the surface of the cap that contacts the evacuation port.

4. The process of claim 3 wherein the soft metal comprises indium.

5. The process of claim 1 wherein the step connecting the cap to the evacuation port comprises cold welding the cap to the evacuation port.

6. The process of claim 1 wherein the dewar comprises a cold finger.

7. The process of claim 6 wherein the cold finger is coupled to a cryocooler.

8. The process of claim 6 wherein the dewar further comprises a heat sink coupled to the cold finger.

9. The process of claim 8 wherein the dewar further comprises an RF filter coupled to the heat sink.

* * * * *